(No Model.) 2 Sheets—Sheet 1.

W. F. BREWSTER.
RECORDING THERMOMETER CLOCK.

No. 410,664. Patented Sept. 10, 1889.

Witnesses:
Raphael Netter
Ernest Hopkinson

Inventor
William F. Brewster (No Model.) 2 Sheets—Sheet 2.

W. F. BREWSTER.
RECORDING THERMOMETER CLOCK.

No. 410,664. Patented Sept. 10, 1889.

Witnesses:
Raphael Netter
Ernest Hopkinson

Inventor
William F. Brewster

UNITED STATES PATENT OFFICE.

WILLIAM F. BREWSTER, OF NEW YORK, N. Y.

RECORDING-THERMOMETER CLOCK.

SPECIFICATION forming part of Letters Patent No. 410,664, dated September 10, 1889.

Application filed March 16, 1889. Serial No. 303,584. (No model.)

*To all whom it may concern:*

Be it known that I, WILLIAM F. BREWSTER, a citizen of the United States, residing at New York, in the State of New York, have invented certain new and useful Improvements in Recording-Thermometers, of which the following is a specification.

This invention relates to improvements in what are known as "recording-thermometers"—that is, thermometers which make on a sheet or other suitable surface a record of the temperature during a given period of time. A description of such a recording-thermometer is found in United States Patent No. 392,310, granted me November 6, 1888.

In practice it has been found that with recording-thermometers constructed, so far as their marking medium and holder are concerned, in accordance with Letters Patent No. 392,310, just referred to, it was difficult to read the time at which the temperature was being registered or recorded upon the recording sheet or surface, owing to the fact that the marking medium and its holder cover the portion of the recording sheet or surface upon which the record is being made, and in order to ascertain what the temperature is at that particular time it is necessary to move the marking medium and its holder away from its normal position in front of the recording sheet or surface and the indicator portion of the thermometer, so as to expose the recording sheet or surface to view, and then to return the marking medium and its holder back again to their normal position for making a record after the point on the recording-sheet last marked thereon has been ascertained.

The object of the present invention is, first, to provide means whereby the temperature can be readily read on instruments which are provided with holders carrying marking mediums—such as an inked or carbonized ribbon or sheet—independent of and not moving with the recording-sheets when the latter are making a record, and in these respects, like those instruments described in Letters Patent No. 392,310, at the time the record is being made without disturbing the marking medium and its holder, and, second, to provide means whereby the instrument is made more compact in form.

Figure 1:
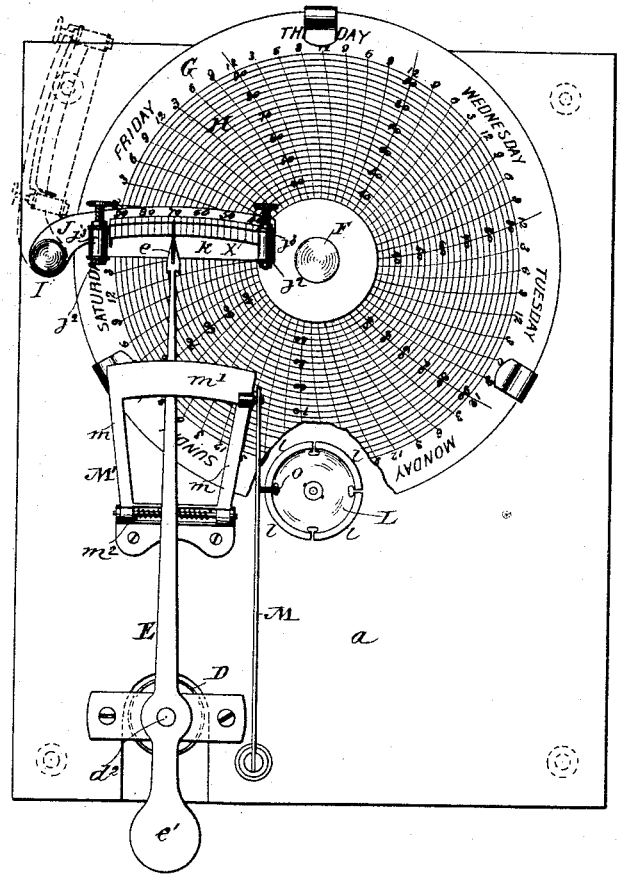
Figure 3:
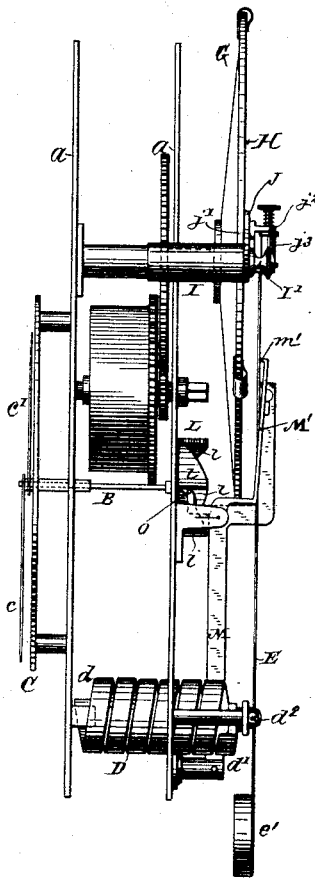
Figure 2:
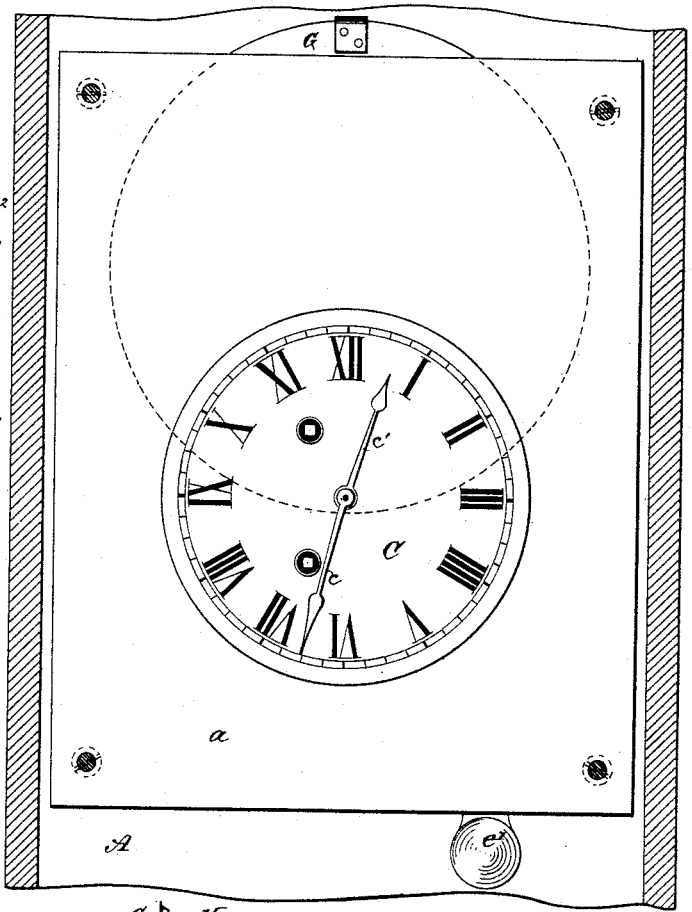
Figure 4:
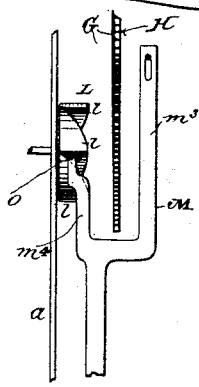

The present improvements consist, first, in providing recording-thermometers like those just referred to with independent time-indicating devices, so that by observing the point on the scale provided on such instruments for reading the temperature at the time the record is being made, over which the indicator of the thermometer is, and also the time of day indicated by the independent time-indicating devices, one can readily read the temperature and the time when a record is being made without in any way disturbing the marking medium and its holder; second, in providing such thermometers with a lever of peculiar shape, so that one part of said lever can work on both sides of the recording-sheet, instead of on only one side, as heretofore, and, third, in arranging the thermometer and other portions of the mechanism so that the thermometer is contained within the space between the back plate and the arm attached to the free end of the thermometer, thus making the whole instrument more compact in form and desirable in shape.
In the annexed drawings, Figure 1 is a front view of a recording-thermometer, showing the recording-sheet partly broken away and with a holder carrying a marking medium independent of and not moving with the recording-sheet when the latter is making a record. Fig. 2 is a front view of the opposite side of such an instrument provided with independent time-indicating devices. Fig. 3 is a side view of the same, and Fig. 4 is a detail view of the improved lever.

The letter A represents a portion of the case which is to contain the various parts of the mechanism.

*a a* represent the plates of a clock-work mechanism of the well-known marine form, and in which the minute-hand arbor is represented by B, which arbor is caused to revolve once in one hour by the ordinary clock-work train, and it is thought unnecessary to show or describe the other portions of the train, as the construction of it is well known to all skilled in the art to which such trains pertain. The plates *a a* are secured together and to the case A in any of the well-known ways, and in the present instance are made large enough to receive the other portions of the mechanism.

One end of the minute-hand arbor B has connected with it the usual time-indicating devices, consisting of the well-known dial and hands, one of which hands is connected directly to the arbor B, and the other with a sleeve revolving on said arbor, which sleeve revolves once to the arbor B's twelve times, and this result is accomplished by the usual means employed in clocks for this purpose.

C represents the dial and $c$ the hand or indicator attached directly to the arbor B, and $c'$ the hand or indicator attached to the sleeve. The hands or indicators $c\ c'$ are arranged in connection with the dial C in the usual manner employed in clocks, and are what I have hereinbefore designated as "independent time-indicating devices."

D represents a thermometer, which in the present instance is of the well-known coiled shape and bimetallic construction, with one of its ends $d$ rigidly secured to one of the plates $a$, and with its other end $d'$ provided with a shaft $d^2$, which passes through and freely moves in a suitably-constructed bearing for it attached to the other plate $a$. To the opposite end of the shaft $d^2$ there is attached, at right angles thereto, an arm E, one end of which is provided with a stylus $e$, and its other end with a counter-weight $e'$.

Suitably arranged in connection with the stylus $e$ and arm E and attached to one of the plates $a$ is the stud on which revolves a circular plate G, which is preferably provided at its edges with suitable clamps or projections, under which the outer edge of a circular sheet of paper or other material H is placed and held in position against the circular plate G.

F is a nut which screws on a short sleeve secured to the plate G, and securely holds the center of the sheet H to the plate G and causes the sheet H and plate G to revolve together as one. The plate G in the present instance is caused to revolve by the clockwork train once in seven days by suitably-constructed pinions and gear-wheels; but it may be made to revolve in any desired period of time.

The recording-sheet H has its face printed in a way well understood, with curved radial lines and with concentric circles, the curved radial lines representing divisions of time and the concentric circles divisions of temperature. The periphery of the sheet is printed with the days of the week and with the hours of each day.

The plate G and its recording-sheet H are arranged in relation to the stylus $e$ on the arm E, so that the free end of the stylus as it sweeps over the sheet H will describe the same curve and directly over the curved radial line pointed on the recording-sheet H when the latter is stationary, as is shown in the drawings.

To the plate $a$, in which is secured the stud on which the recording-sheet H revolves, there is secured another stud I, nearly on a horizontal plane with the stud provided with the nut F and at a suitable distance therefrom to permit of the recording-sheet H being removed from the plate G without interference. To this stud I a holder or bridge J is hinged, so as to swing in a plane substantially parallel to that in which the recording-sheet G revolves. This holder consists of a horizontal bar $j$, with two vertical ends $j'\ j'$, having ears $j^2\ j^2$. Through these ears $j^2\ j^2$ pass the ribbon or sheet holding bobbins $j^3\ j^3$, having the usual tension-springs. On these bobbins there is held or carried the inked or carbonized ribbon or sheet K, which is fed, as occasion requires, from one to the other, forming what I have termed a "marking medium." The holder is so arranged that the marking medium K is held underneath the stylus $e$ of the arm E and between the stylus $e$ and recording-sheet H.

To enable the face of the recording-sheet to be exposed, so that the stylus $e$ of arm E may be set at the proper point, or so that the recording-sheet H can be removed and another one replaced, the holder J is hinged or pivoted on the stud I, so that the holder J and marking medium K are swung in a plane substantially parallel with that of the recording-sheet, suitable stops being provided to limit the movement of the holder in each direction. A nut I' on the stud I secures the holder or bridge in either of its two desired positions, one of the positions being shown in full lines and the other in dotted lines.

On the holder J is a thermometric scale X, the same being identical with that which is on the recording-sheet just underneath the scale. The object of the scale X is, first, to adjust the arm E so that it will indicate and register the proper temperature, and, second, being correctly adjusted, the temperature being at any time registered under the marking-medium K by the stylus $e$ on the recording-sheet H can be read by the degree indicated on the scale X by the end or pointer of the arm E.

On the end of the arbor B, adjacent to the recording-sheet H, a face-cam L is secured. This cam L is provided with four projections or lifting-faces $l\ l\ l\ l$.

To a suitable bearing attached to the plate $a$ one end of a lever M is pivoted, so as to move in a plane at right angles to the plane of the recording-sheet. To a bracket attached to the plate $a$ there is pivoted another lever M', composed of two arms $m\ m$ and the cross-bar $m'$, and a spring $m^2$ tends to move or swing the end of the lever M', provided with the cross-arm $m'$, toward the plate $a$ and recording-sheet H.

The arm M may be made as shown in Figs. 1, 3, and 4; but in order to make the mechanism more compact or to permit the use of a larger recording-sheet on a given size of mechanism I make the said arm of the form shown in Fig. 4. It will be observed that by reason of the construction therein shown the cam L is placed much farther under the circular revolving plate G, which carries upon it the recording-sheet H, and by reason of this the mechanism is made more compact for a given size of recording-sheet or permits the use of a larger recording-sheet for a given size of mechanism.

The lever M, when made as shown in Figs. 1, 3, and 4, is first bent outward at nearly a right angle, and then again at nearly a right angle, so that the two end portions will be in planes nearly parallel to each other. This is clearly shown in Fig. 3, and by reason of this construction the free end of the lever is brought outside of the recording-sheet H and nearly at the side $m$ of M'. The free end of lever M is connected to the free end of the lever M' by means of a pin-and-slot connection. The lever M is also provided with a pin or projection $o$, which is so placed as to be in the path of travel of the cam-faces $l\ l\ l\ l$ of the cam L, and the pin or projection $o$ is held in contact with one of the said cam-faces $l$ by the action of the spring $m^2$ upon the lever M' through its connection with the lever M. The levers M' and M are caused to move back and forth four times each revolution of the cam L, which in the present instance revolves once in one hour.

The lever M, when made as shown in Fig. 4, instead of being bent, as shown in Figs. 1 and 3, is made forked or split, as shown in said figure. The part $m^3$ is here made longer than the part $m^4$, but it may be otherwise. The free end of part $m^3$ is connected to the free end of the lever M' by means of a pin-and-slot connection. The free end of the part $m^4$ is provided with the same pin or projection $o$ which works in connection with the cam L and its cam-faces $l\ l\ l\ l$ in substantially the same manner as does the pin $o$ in Figs. 1, 3, and 4, and thus causes the levers M and M' to move as in those figures.

The arrangement of the levers M and M' is such that the cross-bar $m$ is over a portion of the recording-sheet H, as well as over the arm E of the thermometer, and the extent of its movement is such that the cross-bar strikes the arm E and causes it to be moved sufficiently to bring the stylus $e$ in contact with the marking medium K and force the medium against the recording-sheet, and thus produce a record on the sheet K of the temperature indicated by the arm E of the thermometer. The space between the parts $m^3$ and $m^4$, Fig. 4, is such that the circular plate G and recording-sheet H can freely pass between $m^3$ and $m^4$ when the lever M is at either limit of its movement by the face-cam L. The face-cam L making one revolution in an hour, and there being four cam faces or projections, the stylus $e$ strikes the marking medium K once in fifteen minutes, and the recording-sheet only moves after each stroke a slight distance, when another stroke is made, hence the points or marks made upon the recording-sheet by the stylus and marking medium appear as a continual line.

The arm E is adjusted so as to indicate and record the correct temperature in a well-understood way, and need not be fully explained herein. An example of such an adjustment is found in Letters Patent No. 392,310, heretofore granted me.

I do not wish to limit myself to the exact form or construction of the parts herein shown and described, which is what I deem the preferred form, for it is manifest that they could be varied without changing the operation of the several elements in the combination composing the improvement—as, for instance, instead of four cam-faces $l\ l\ l\ l$ and one pin $o$, as heretofore shown and described, a single cam-face on the lever M and four pins on the cam L would answer the purpose equally well; but

What I claim, and desire to secure by Letters Patent, is—

1. In a recording-thermometer, the combination, substantially as set forth, of a recording-sheet, a mechanism for moving the same, a thermometer with its free end connected to an arm, a stylus on said arm, a holder independent of the recording-sheet, a marking medium mounted on said holder and disposed between the recording-sheet and stylus, and independent time-indicating devices connected with the mechanism for moving the recording-sheet, whereby the time at which a record of the temperature is being made on the recording-sheet can be readily read without disturbing the holder and marking medium mounted on said holder.

2. In a recording-thermometer, the combination, substantially as set forth, of a recording-sheet, a mechanism for moving the same, a thermometer with its free end connected to an arm, a stylus on said arm, a marking medium disposed between the stylus and recording-sheet, and a hammer connected to the mechanism for moving the recording-sheet, one portion of which is forked or split, substantially as described, whereby the recording-sheet and its support are permitted to move between such forked portions, while the hammer is operated by the mechanism for moving the recording-sheet.

3. In a recording-thermometer, the combination, substantially as set forth, of a recording-sheet, mechanism for moving the same, and a thermometer, one end of which is secured to the mechanism and its other or free end projects toward the plane occupied by the recording-sheet and is provided with an arm and stylus arranged to act upon the recording-sheet, whereby the whole instrument is made more compact in form and desirable in shape.

WILLIAM F. BREWSTER.

Witnesses:
 FRANK E. HARTLEY,
 ROBT. F. GAYLORD.